US008832332B2

(12) United States Patent
Namihira

(10) Patent No.: US 8,832,332 B2
(45) Date of Patent: Sep. 9, 2014

(54) PACKET PROCESSING APPARATUS

(75) Inventor: Daisuke Namihira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/805,019

(22) Filed: Jul. 7, 2010

(65) Prior Publication Data

US 2010/0281190 A1 Nov. 4, 2010

Related U.S. Application Data

(63) Continuation of application No. PCT/JP2008/050700, filed on Jan. 21, 2008.

(51) Int. Cl.
*G06F 13/00* (2006.01)
*H04L 12/773* (2013.01)
*H04L 12/54* (2013.01)
*H04L 12/863* (2013.01)

(52) U.S. Cl.
CPC ............ *H04L 12/5693* (2013.01); *H04L 45/60* (2013.01); *H04L 47/6215* (2013.01)
USPC .................. 710/33; 710/34; 710/35

(58) Field of Classification Search
CPC .. H04L 12/5693; H04L 47/6215; H04L 45/60
See application file for complete search history.

(56) References Cited

U.S. PATENT DOCUMENTS

| | | | | |
|---|---|---|---|---|
| 5,941,959 | A * | 8/1999 | Fishler et al. .................... | 710/33 |
| 6,512,741 | B1 | 1/2003 | Kohzuki et al. | |
| 6,920,112 | B1 * | 7/2005 | McCloghrie et al. ......... | 370/252 |
| 6,981,074 | B2 * | 12/2005 | Oner et al. ...................... | 710/32 |
| 7,610,330 | B1 * | 10/2009 | Quinn et al. ................... | 709/201 |
| 7,647,436 | B1 * | 1/2010 | Westrelin et al. ............... | 710/33 |
| 7,957,379 | B2 * | 6/2011 | Minami et al. ................. | 370/392 |
| 7,987,302 | B2 * | 7/2011 | Diepstraten et al. ............ | 710/33 |
| 2002/0087751 | A1 * | 7/2002 | Chong, Jr. ....................... | 710/33 |

FOREIGN PATENT DOCUMENTS

| | | |
|---|---|---|
| JP | 2000-031974 | 1/2000 |
| JP | 2000-083055 | 3/2000 |
| JP | 2000-83055 | 3/2000 |
| JP | 2000-132411 | 5/2000 |
| JP | 2001-268082 | 9/2001 |
| JP | 2002-94556 | 3/2002 |
| JP | 2005-64882 | 3/2005 |
| JP | 2006-80936 | 3/2006 |

OTHER PUBLICATIONS

Japanese Office Action issued May 8, 2012 in corresponding Japanese Patent Application No. 2009-550385 (2 pages) (3 pages English translation).
International Search Report for PCT/JP2008/050700, mailed Mar. 4, 2008.
Office Action mailed Aug. 7, 2012 in corresponding Japanese Patent application No. 2009-550385 (3 pages) (4 pages English translation).

* cited by examiner

*Primary Examiner* — Henry Tsai
*Assistant Examiner* — Jing-Yih Shyu
(74) *Attorney, Agent, or Firm* — Staas & Halsey LLP

(57) ABSTRACT

By referring to a receiving connection information table stored in a memory, a receiving assignment CPU assigns packets to parallel processing CPUs in such a manner that the packets received from the same connection are subjected to a receiving process by a corresponding parallel processing CPU. Each parallel processing CPU identifies the input QoS of a packet and notifies a QoS processing CPU, corresponding to that identified input QoS, of the packet. Each QoS processing CPU is arranged so that it corresponds to a QoS processing queue group in the memory and performs a QoS process on this QoS processing queue group.

3 Claims, 7 Drawing Sheets

| IP ADDRESS/PORT | ASSIGNED CPU |
|---|---|
| IPa/Pa | PARALLEL PROCESSING CPU 102-1 |
| IPb/Pb | PARALLEL PROCESSING CPU 102-2 |
| ⋮ | |

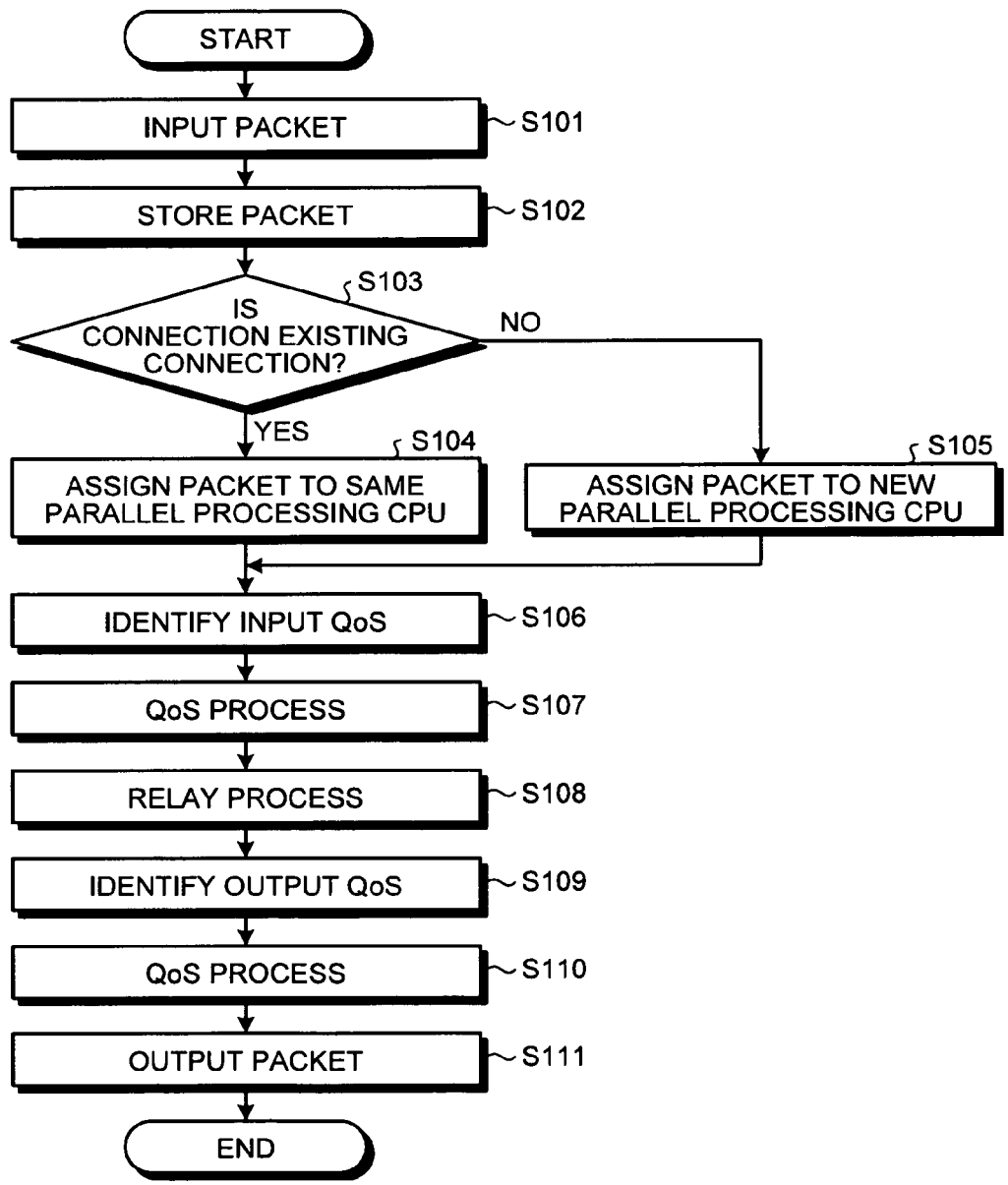

PACKET PROCESSING APPARATUS

CROSS-REFERENCE TO RELATED APPLICATION

This application is a continuation of International Application No. PCT/JP2008/050700, filed on Jan. 21, 2008, the entire contents of which are incorporated herein by reference.

FIELD

The embodiments discussed herein are directed to a packet processing apparatus and packet processing method.

BACKGROUND

In general, in a computer network, relay devices, such as switches or routers, are arranged between a server and a client to perform a relay process on packets. Conventional relay devices only perform a process of layer 2 (data link layer) and layer 3 (network layer) of the open systems interconnection (OSI) reference model. However, in recent years, relay devices, in some cases, have performed a higher layer process. Specifically, relay devices that perform a load distribution process for distributing loads on servers; a firewall process for preventing attacks from outside; or a higher-layer process such as a VPN process including a secure socket layer-virtual private network (SSL-VPN) and security architecture for Internet Protocol (IPsec) that is used for hiding communication between a client and a server have been introduced. Furthermore, because relay devices can performs analyses of the higher layer, in some cases, a quality of service (QoS) process using information on the higher layer is performed.

Furthermore, devices that are generally called network servers and that perform a process between the higher-layer and layer 2 and layer 3 have been introduced and are arranged in a computer network. Due to their versatility, loads in a network are sometimes concentrated; therefore, basic functions having high performance are desired for network servers. Because the relay process performed by the network server is not such a complicated process, it is possible to speed up the process using hardware implementation. In contrast, for a higher-layer process performed by the network server, it is difficult to speed up the process with a simple hardware implementation because it requires a complicated process and flexible expandability with respect to new services. Accordingly, to speed up a higher-layer process in a network server, it is necessary to speed up the software process, in other words, to improve the process performance of central processing units (CPUs).

In recent years, because the process performance of a single CPU has almost reached full capacity, by installing a plurality of CPUs or CPU cores (hereinafter, referred to as a "CPU") in a single device, an attempt to speed up a software process has been performed. In such a case, because it is not possible to speed up the software process simply by a plurality of CPUs performing the same process, upon receiving a plurality of packets to be processed, the network server assigns the packets to the plurality of CPUs and the CPUs then each perform parallel processing.

FIG. 1 is a schematic diagram illustrating a basic architecture of the above-described parallel processing. As illustrated in FIG. 1, the packets to be processed are assigned, by an assignment processing unit 10, to CPUs 20-1 to 20-n (n is an integer equal to or greater than two), which are arranged in parallel, and are processed by the assigned CPUs. There are various kinds of methods for assigning packets performed by the assignment processing unit 10. For example, Japanese Laid-open Patent Publication No. 2005-64882 discloses a technology for determining the assigned CPUs using hash values and information on layer 3 or lower. When such parallel processing is performed, it is important to consider dependency on the plurality of CPUs. Specifically, for information shared by the plurality of CPUs, the CPUs possibly refer to and update the same information. However, if the CPUs simultaneously refer to and update the information, malfunction possibly occurs. Accordingly, when a single CPU accesses such shared information, it is necessary to perform an exclusive process in which access from CPUs other than the CPU that is accessing the information is prohibited.

In a complicated process such as the higher-layer process, the frequency of accessing the shared information, which a plurality of CPUs shares, is high, thus the frequency of the exclusive process occurring accordingly becomes high. As the frequency of the exclusive process occurring becomes high, the degree of improving parallel processing performance is reduced. Specifically, if the number of CPUs is doubled, theoretically, process performance is assumed to be doubled. However, in practice, the process performance never becomes double because an exclusive process between the CPUs occurs. In an extreme case, the process performance may drop compared with a case in which the number of CPUs is not doubled. Accordingly, to improve process performance, it is extremely important to reduce the frequency of the exclusive process.

When the higher-layer process is performed, it is conceivable to use a method in which packets are assigned to different CPUs for each connection, such as transmission control protocol (TCP) or user datagram protocol (UDP), and packets that are transmitted by the same connection are processed by the corresponding CPUs. Accordingly, a single CPU accesses connection information for each connection; therefore, an exclusive process due to accessing connection information, i.e., the basic information on the higher-layer process, becomes unnecessary.

However, if a QoS process is performed, even when packets are assigned for each connection, there might be a case in which different CPUs simultaneously access a queue for the same QoS process, which causes a problem in that an exclusive process cannot be eliminated. Specifically, in the QoS process, in general, queues are mapped in accordance with physical ports and are assigned in accordance with the setting of policy. Accordingly, packets transmitted by different connections are usually mapped onto the same queue.

More specifically, as in the example illustrated in FIG. 2, there is a possibility that both a packet that is processed by a CPU 20-1 corresponding to a connection TCP #1 and a packet that is processed by a CPU 20-2 corresponding to a connection TCP #2 may be mapped onto the same queue (in FIG. 2, the top queue) in a QoS processing queue group 30. To prevent the simultaneous occurrence of such a mapping, an exclusive process between the CPU 20-1 and the CPU 20-2 is needed.

With this configuration, for a queue process using a plurality of queues that a plurality of processing units share, because a dedicated queue processing unit performs the queue process, no access conflict occurs with respect to the plurality of queues received from the plurality of processing units that perform parallel processing. Therefore, an exclusive process between the processing units becomes unnecessary. In other words, when the CPUs in the plurality of CPUs perform parallel processing on packets, it is possible to improve process performance by reducing the frequency of an exclusive process occurring between the CPUs.

With this configuration, each of the processing units corresponds to a single connection and packets are assigned to processing units corresponding to connections that are used to transmit the packets. Accordingly, when a processing unit performs a process on a packet, no access conflict occurs with respect to information on each connection; therefore, it is possible to reliably reduce the frequency of an exclusive process occurring between the processing units.

With this configuration, when the packet is input, the packet is assigned to a processing unit corresponding to the receiving connection, whereas, when the packet is output, the packet is assigned to a processing unit corresponding to the sending connection. Accordingly, even when a receiving connection differs from a sending connection for a single packet, it is possible to assign the packet to processing units corresponding to the connections. As a result, for example, even when a receiving connection is terminated in the packet processing apparatus, a packet can be processed by the processing unit corresponding to the sending connection that is different from the receiving connection. Therefore, no access conflict occurs, in the processing units, with respect to information on the same connection. Accordingly, it is possible to reliably reduce the frequency of the exclusive process occurring between the processing units.

With this configuration, because the processing units identify the quality of packets, whereas, the queue processing units perform a queue process in accordance with the quality of packets, identification of the quality of packets, which can be simultaneously processed, is performed in parallel, and a queue process that possibly causes access conflict with respect to queues is performed in order. Accordingly, it is possible to speed up the queue process and also to reduce the frequency of the exclusive process occurring.

With this configuration, because the processors corresponding to the queue groups each perform a queue process, the queue process can be performed in parallel by the processors, thus further speeding up the queue process.

With this configuration, because a relay process for setting the destination of the packets is performed, in relay devices such as routers or switches, it is possible to improve process performance by reducing the frequency of the exclusive process between the CPUs.

With this configuration, because a higher-layer process is performed that belongs to a higher layer in which parallel processing is difficult, in multifunctional apparatuses such as network servers, it is possible to improve process performance by reducing the frequency of an exclusive process between the CPUs.

With these configurations, because dedicated processors perform the queue process on queues shared by a plurality of processors, no access conflict occurs with respect to queues from processors that perform parallel processing; therefore, exclusive process between the processors becomes unnecessary. In other words, when CPUs perform, in parallel, a process on packets, it is possible to improve process performance by reducing the frequency of an exclusive process between CPUs.

SUMMARY

According to an aspect of an embodiment of the invention, a packet processing apparatus includes an identifying unit that identifies a type of communication used for transmitting a received packet; a plurality of processing units that are provided corresponding respectively to types of communication and each identify a desired quality of the packet for which the identifying unit identifies the type of communication; and a plurality of queue processing units that are corresponding respectively to desired qualities of the packet and performs a queue process on the packet whose desired quality is identified by the corresponding processing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is an example of a routing table according to the first embodiment;

FIG. 8 is a flowchart illustrating an operation performed when packets according to the first embodiment are relayed;

DESCRIPTION OF EMBODIMENTS

An overview of the present invention is to provide processors that are dedicated to a QoS process in which an enqueuing process and a dequeuing process are performed on packets with respect to a plurality of queues corresponding to the quality of the packets, and to perform, using the dedicated processors, the QoS process for inputting and outputting packets. Preferred embodiments of the present invention will be explained with reference to accompanying drawings.

[a] First Embodiment

Figure 1:
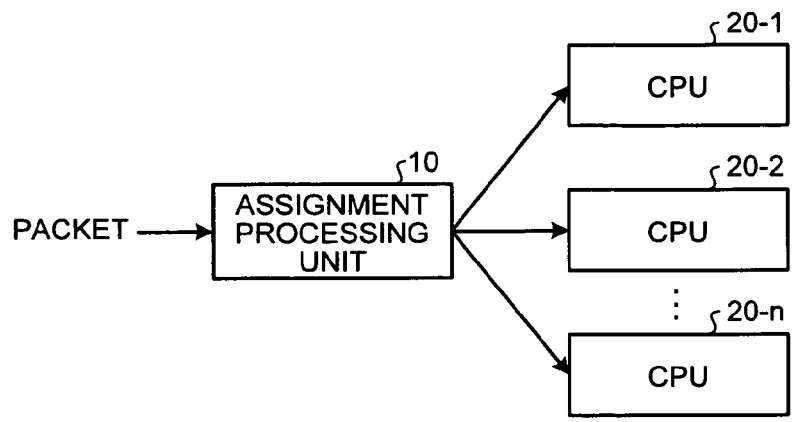
FIG. 1 is a schematic diagram illustrating the basic architecture for parallel processing.
Figure 2:
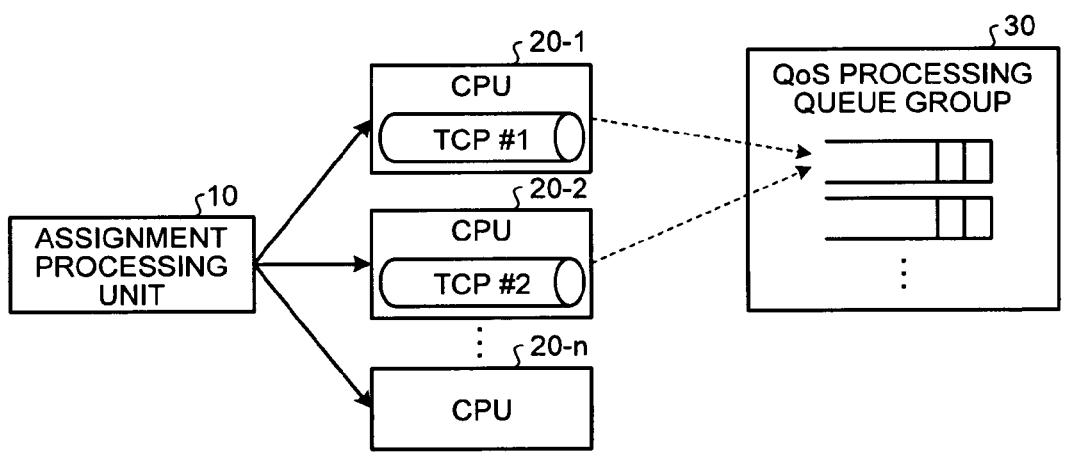
FIG. 2 is a schematic diagram illustrating an example of a conflict in a QoS process.
Figure 3:
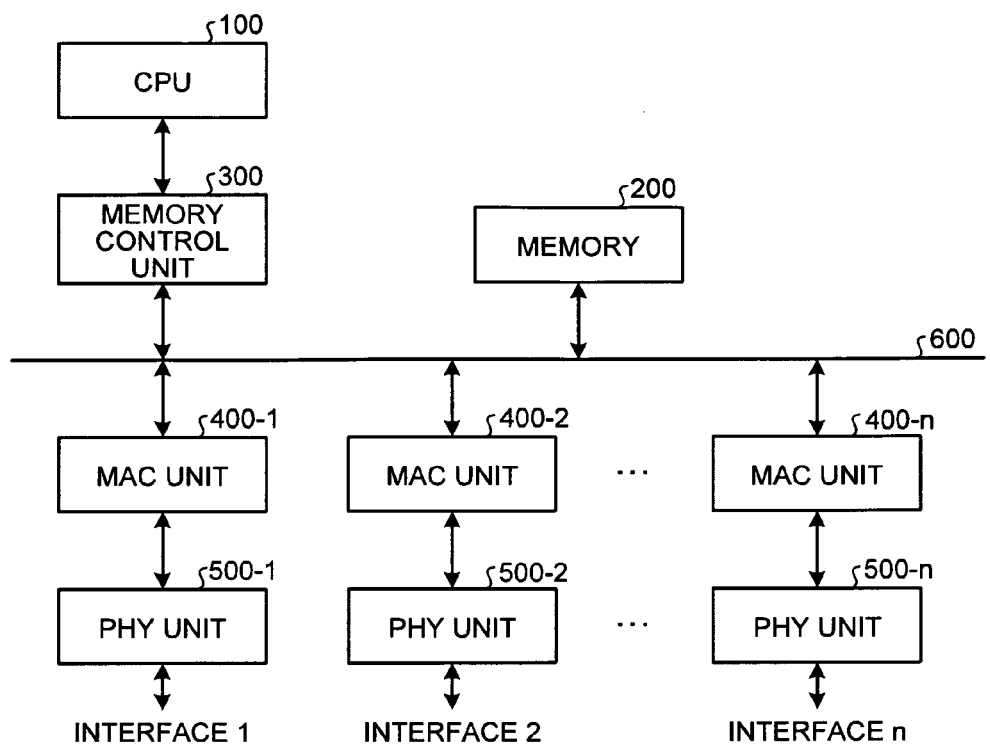
FIG. 3 is a block diagram illustrating, in outline, the configuration of a packet processing apparatus according to a first embodiment.

FIG. 3 is a block diagram illustrating, in outline, the configuration of a packet processing apparatus according to a first embodiment of the present invention. The packet processing apparatus illustrated in FIG. 3 is assumed to be installed in, for example, a relay device such as a network server. Alternatively, the packet processing apparatus can be installed in a terminal device such as a server or a client. The packet processing apparatus illustrated in FIG. 3 has a CPU unit 100, a memory 200, a memory control unit 300, media access control (MAC) units 400-1 to 400-n (n is an integer equal to or greater than one), physical (PHY) units 500-1 to 500-n, and an internal bus 600.

The CPU unit 100 has a plurality of CPUs. The CPUs each performs a process using information stored in the memory 200. At this time, the CPUs in the CPU unit 100 individually perform different processes in parallel.

The memory 200 stores therein information that is used by the CPUs in the CPU unit 100. Specifically, the memory 200 stores therein information contained in packets that are received from outside (hereinafter referred to as "packet information") or connection information that is used for packet transmission.

The memory control unit 300 controls the exchange of information between the CPU unit 100 and the memory 200 when the CPU unit 100 performs a process using the information stored in the memory 200. Specifically, when the CPU unit 100 performs a process, the memory control unit 300 acquires necessary information from the memory 200 via the internal bus 600 and supplies the information to the CPU unit 100.

The MAC units 400-1 to 400-n perform a process partly belonging to layer 2 in which a method of sending/receiving packets and a method of detecting errors are set. In a similar manner, the PHY units 500-1 to 500-n are connected to external interfaces 1 to n, respectively, and perform a process belonging to layer 1 (physical layer). the MAC units 400-1 to 400-n are associated with the PHY units 500-1 to 500-n, respectively, (e.g., the MAC unit 400-1 is associated with the PHY unit 500-1) and integrally formed on, for example, a network card in an associated manner. Packets are input, via the MAC units 400-1 to 400-n and the PHY units 500-1 to 500-n, from the interfaces 1 to n to the packet processing apparatus, and packets are output from the packet processing apparatus to the interfaces 1 to n.

The internal bus 600 connects processing units in the packet processing apparatus and transmits information. Specifically, the internal bus 600 transmits, for example, packet information that is input from the interfaces 1 to n from the MAC units 400-1 to 400-n to the memory 200. The internal bus 600 also transmits the packet information from the memory 200 to the memory control unit 300.

Figure 4:
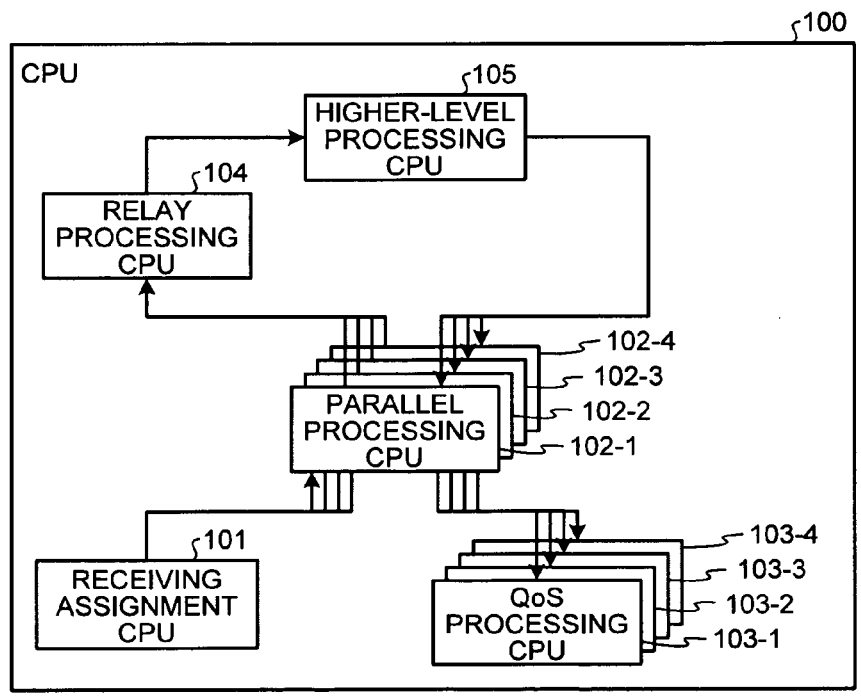
FIG. 4 is a block diagram illustrating the internal configuration of a CPU unit according to the first embodiment.
Figures 5, 6:
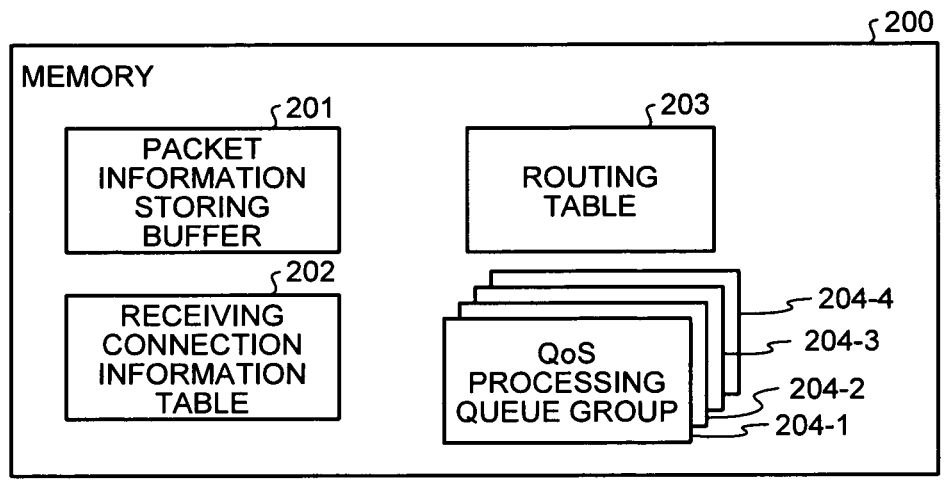
FIG. 5 is a block diagram illustrating the internal configuration of a memory according to the first embodiment.
FIG. 6 is an example table of receiving connection information according to the first embodiment.

FIG. 4 is a block diagram illustrating the internal configuration of the CPU unit 100 according to the first embodiment. FIG. 5 is a block diagram illustrating the internal configuration of the memory 200 according to the first embodiment. The CPU unit 100 illustrated in FIG. 4 has a receiving assignment CPU 101, parallel processing CPUs 102-1 to 102-4, QoS processing CPUs 103-1 to 103-4, a relay processing CPU 104, and a higher-level processing CPU 105. The memory 200 illustrated in FIG. 5 has a packet information storing buffer 201, a receiving connection information table 202, a routing table 203, and QoS processing queue groups 204-1 to 204-4.

In FIG. 4, by referring to the receiving connection information table 202 stored in the memory 200, the receiving assignment CPU 101 assigns packets to the parallel processing CPUs 102-1 to 102-4 in such a manner that the packets received from the same connection are subjected to a receiving process by a corresponding parallel processing CPU. Specifically, for example, if packets received from a TCP connection are subjected to a receiving process by the parallel processing CPU 102-1, the receiving assignment CPU 101 assigns the packets in such a manner that all of the packets received from that TCP connection are subjected to the receiving process by the parallel processing CPU 102-1.

When the packets are assigned to the parallel processing CPUs 102-1 to 102-4 by the receiving assignment CPU 101, the parallel processing CPUs 102-1 to 102-4 acquire packet information on the packets from the packet information storing buffer 201 in the memory 200 and perform a predetermined receiving process. Then, each parallel processing CPU 102-1 to 102-4 identifies the input QoS of a packet and notifies one of the QoS processing CPUs 103-1 to 103-4, corresponding to that identified input QoS, of the input QoS of the packet.

Furthermore, each parallel processing CPU 102-1 to 102-4 acquires, from the packet information storing buffer 201 in the memory 200, packet information on a packet that has been subjected to a higher-layer process performed in the higher-level processing CPU 105 and performs a predetermined sending process. At this time, parallel processing CPUs 102-1 to 102-4 acquire packet information on packets subjected to a receiving process performed by the corresponding parallel processing CPUs 102-1 to 102-4 and also perform a sending process. Then, each parallel processing CPU 102-1 to 102-4 identifies the output QoS of a packet and notifies one of the QoS processing CPUs 103-1 to 103-4, corresponding to that identified output QoS, of the output QoS of the packet.

In the embodiment, four parallel processing CPUs 102-1 to 102-4 are arranged in the CPU unit 100; however, the number of parallel processing CPUs is not limited to four. Any arbitrary number equal to or greater than two can be arranged.

The QoS processing CPUs 103-1 to 103-4 are arranged in such a manner that they are associated with the QoS processing queue groups 204-1 to 204-4 in the memory 200. The QoS processing CPUs 103-1 to 103-4 perform a QoS process using the QoS processing queue groups 204-1 to 204-4, respectively. Specifically, if the parallel processing CPUs 102-1 to 102-4 notify the corresponding QoS processing CPUs 103-1 to 103-4 of the input QoS or the output QoS of packets, each of the QoS processing CPUs 103-1 to 103-4 performs an enqueuing process on a packet to put it into a queue, where the queue corresponds to the notified input QoS or output QoS, in the corresponding QoS processing queue groups 204-1 to 204-4, and then performs a dequeuing process on a packet in accordance with each queue.

In other words, in addition to the receiving process and the sending process performed by the parallel processing CPUs 102-1 to 102-4, the QoS processing CPUs 103-1 to 103-4 perform the QoS process on the packets. Accordingly, because the parallel processing CPUs 102-1 to 102-4 do not access the QoS processing queue groups 204-1 to 204-4, an exclusive process between the parallel processing CPUs 102-1 to 102-4 becomes unnecessary. Furthermore, because each of the queues included in the QoS processing queue groups 204-1 to 204-4 corresponds to only one of the QoS processing CPUs 103-1 to 103-4, an exclusive process between the QoS processing CPUs 103-1 to 103-4 also becomes unnecessary.

In the embodiment, four QoS processing queue groups 204-1 to 204-4 are arranged in the CPU unit 100; however, the number of QoS processing queue groups is not limited to four. Furthermore, the number of QoS processing queue groups does not have to be the same as the number of the parallel processing CPUs as long as each of the queues in the QoS processing queue groups 204-1 to 204-4 corresponds to one of the QoS processing CPUs.

By referring to the routing table 203 stored in the memory 200, the relay processing CPU 104 sets the destination of packets that have been subjected to the receiving process performed by the parallel processing CPUs 102-1 to 102-4. In the embodiment, because a single relay processing CPU 104 performs a relay process on packets, the memory 200 stores therein only a single routing table 203 that is frequently updated and the size thereof becomes relatively large. Accordingly, when compared with a case in which CPUs each perform a relay process by referring to unique routing tables, it is possible to save the capacity of the memory 200 and also to reduce processing loads due to synchronization of the plurality of routing tables.

Furthermore, because the relay process performed by the relay processing CPU 104 is a process belonging to layer 2 and layer 3, the processing load thereof is relatively small. Thus, only a single relay processing CPU 104 can perform the relay process. However, even when the process performance of the relay processing CPU 104 is insufficient, it is possible to easily speed up the relay process by performing processes belonging to layer 2 and layer 3 as a hardware implementation.

The higher-level processing CPU 105 performs, on packets, a higher-layer process that is difficult to be performed by the parallel processing CPUs 102-1 to 102-4. Furthermore, when, for example, a new function is installed in the packet processing apparatus, the new function can be temporarily installed in the higher-level processing CPU 105 to perform a process on packets.

In FIG. 5, the packet information storing buffer 201 stores therein packet information on packets that are input to the packet processing apparatus from the interfaces 1 to n. Specifically, the packet information storing buffer 201 stores therein packet information, for each packet, by acquiring the packet information on the packets, which are input via a network card equipped with the MAC unit and the PHY unit, by way of the internal bus 600.

The receiving connection information table 202 stores therein the correlations between receiving connections to which packets input to the packet processing apparatus are transmitted and parallel processing CPUs 102-1 to 102-4 that are the assigned objects. Specifically, the receiving connection information table 202 stores therein, in an associated manner, for example, as illustrated in FIG. 6, IP addresses/ports according to receiving connections and parallel processing CPUs 102-1 to 102-4 that are the assigned objects. In the example illustrated in FIG. 6, a packet containing an IP address of "IPa" and a port of "Pa" is assigned to the parallel processing CPU 102-1.

In the receiving connection information table 202, every time a new receiving connection is established, the correlation between the IP addresses/ports and the assigned CPUs is determined and registered by the receiving assignment CPU 101. If packets are input from the existing receiving connection, by referring to the receiving connection information table 202, the receiving assignment CPU 101 assigns the packets to the corresponding parallel processing CPUs 102-1 to 102-4, serving as the assigned objects of the packets, to which packets previously input from the same receiving connection are assigned. Accordingly, all of the packets that are input from the same receiving connection are subjected to the receiving process by the corresponding parallel processing CPUs 102-1 to 102-4. Therefore, because only one of the parallel processing CPUs 102-1 to 102-4 accesses a piece of corresponding information related to the receiving connection, an exclusive process becomes unnecessary.

The routing table 203 stores therein destinations of packets used for the relay process. Specifically, in the example as illustrated in FIG. 7, the routing table 203 stores therein the correlation between destination IP addresses of packets and destination interfaces from which packets are to be output. In the example illustrated in FIG. 7, a packet containing a destination IP address of "IPa" is output to the interface 1.

The QoS processing queue groups 204-1 to 204-4 are queue groups in which the queues of a plurality of queues, arranged for each desired quality of the packets, are associated with the QoS processing CPUs 103-1 to 103-4 and are then grouped. The QoS processing queue groups 204-1 to 204-4 each have one or more queues. Furthermore, in accordance with instructions from the QoS processing CPUs 103-1 to 103-4, the QoS processing queue groups 204-1 to 204-4 enqueue or dequeue packets to obtain queues according to the desired quality of the packets.

In the following, there will be a description, with reference to the flowchart illustrated in FIG. 8, of an operation for relaying packets performed by the packet processing apparatus configured in the above described manner. The description is mainly given of an operation of the CPUs in the CPU unit 100; therefore, the detailed description of an operation of the memory control unit 300, the MAC units 400-1 to 400-n, and the PHY units 500-1 to 500-n is omitted.

First, if a packet received from the receiving connection is input to the packet processing apparatus (Step S101), packet information on the packet is stored in the packet information storing buffer 201 (Step S102). Then, if the receiving assignment CPU 101 detects that the packet is input, by checking an IP address and a port using the packet information and referring to the receiving connection information table 202, the receiving assignment CPU 101 determines whether a receiving connection to which the packet is transmitted is an existing connection (Step S103). Specifically, if an IP address and a port of the packet have been registered in the receiving connection information table 202, the receiving assignment CPU 101 determines that a receiving connection of the packet is an existing connection. If an IP address and a port of the packet have not been registered in the receiving connection information table 202, the receiving assignment CPU 101 determines that the receiving connection of the packet is a new connection.

If the determination result indicates that the receiving connection is an existing connection (Yes at Step S103), the receiving assignment CPU 101 reads, from the receiving connection information table 202, the assigned CPU corresponding to the IP address and the port of the packet and assigns processing of the packet to the parallel processing CPU that is the object to be assigned to. In other words, processing of the packet is assigned to the parallel processing CPU that has performed a process on a packet that is previously input thereto from the same receiving connection (Step S104).

In contrast, if the receiving connection is a new connection (No at Step S103), the receiving assignment CPU 101 selects a free parallel processing CPU; determines the free parallel processing CPU as the assigned object of the packet; and registers, in the receiving connection information table 202, the correlation between the IP address/port of the packet and the parallel processing CPU that is the assigned objects. In other words, processing of the packet is assigned to a new parallel processing CPU in which a process is not currently being performed (Step S105).

In this way, processes to be performed on packets that are input to the packet processing apparatus are assigned to the corresponding parallel processing CPUs for each receiving connection. In this specification, a description will be given assuming that a process is assigned to the parallel processing CPU 102-1.

If a process is assigned to the parallel processing CPU 102-1, the parallel processing CPU 102-1 performs a predetermined receiving process on the packet. Furthermore, the parallel processing CPU 102-1 identifies the input QoS according to the desired quality of the packet (Step S106) and notifies the QoS processing CPU, corresponding to the identified input QoS, of the input QoS. Specifically, from among the QoS processing queue groups 204-1 to 204-4 in the memory 200, the input QoS of the packet is notified to a QoS processing CPU that manages a QoS processing queue group including that queue corresponding to the input QoS. In this way, the QoS processing CPUs 103-1 to 103-4 are notified, regardless of the receiving connection to which the packet is transmitted, of the input QoS of the packet that uses the corresponding QoS processing queue group. Here, if a queue corresponding to the input QoS of the packet is assumed to be included in, for example, the QoS processing queue group 204-1, the QoS processing CPU 103-1 that manages the QoS processing queue group 204-1 is notified of the input QoS.

If the QoS processing CPU 103-1 is notified of the input QoS, the QoS processing CPU 103-1 performs a QoS process on the queue, corresponding to the input QoS, in the QoS processing queue group 204-1 (Step S107). Specifically, the QoS processing CPU 103-1 performs an enqueuing process on the packet to put the packet into a queue corresponding to the input QoS and performs a dequeuing process on the packet in accordance with that queue. At this time, because only one of the QoS processing CPUs 103-1 to 103-4 performs a QoS process with respect to each queue (QoS processing CPU 103-1 in this case), conflicts do not occur in any queue during the enqueuing process and the dequeuing process. Accordingly, an exclusive process between the QoS processing CPUs 103-1 to 103-4 becomes unnecessary. As a result, it is possible to reduce the frequency of an exclusive process occurring in the CPU unit 100, thus improving the process performance of the CPU unit 100.

If the QoS process is completed, the relay processing CPU 104 performs a relay process in which a packet destination is set (Step S108). Specifically, the relay processing CPU 104 refers to the routing table 203 to set a packet destination in such a manner that the packet is output to an interface corresponding to the destination IP address of the packet. Furthermore, if a higher-layer process that is difficult to be performed by the parallel processing CPUs 102-1 to 102-4 is performed, the higher-level processing CPU 105 performs the higher-layer process.

Then, if processes performed by the relay processing CPU 104 and the higher-level processing CPU 105 are completed, the parallel processing CPUs 102-1 to 102-4 perform a predetermined sending process. After performing the receiving process on packets, the parallel processing CPUs also perform a sending process on the same packets. Accordingly, in this case, the parallel processing CPU 102-1 performs the sending process on the packet. Furthermore, the parallel processing CPU 102-1 identifies the output QoS of the packet (Step S109) and notifies a QoS processing CPU, corresponding to the identified output QoS, of the output QoS. The output QoS of the packet can be different from the input QoS obtained when the receiving process is performed. Here, if a queue corresponding to the output QoS of the packet is assumed to be included in, for example, the QoS processing queue group 204-2, the QoS processing CPU 103-2 that manages the QoS processing queue group 204-2 is notified of the output QoS.

If the QoS processing CPU 103-2 is notified of the output QoS, the QoS processing CPU 103-2 performs a QoS process on the queue corresponding to the output QoS in the QoS processing queue group 204-2 (Step S110). Specifically, the QoS processing CPU 103-2 performs an enqueuing process on the packet of a queue corresponding to the output QoS and performs a dequeuing process on the packet in accordance with that queue. At this time, also, in a similar manner as in the QoS process performed when the receiving process is performed, because only one of the QoS processing CPUs 103-1 to 103-4 performs a QoS process with respect to each queue (QoS processing CPU 103-2 in this case), conflicts do not occur in any queue during the enqueuing process and the dequeuing process. Accordingly, an exclusive process between the QoS processing CPUs 103-1 to 103-4 becomes unnecessary. As a result, it is possible to reduce the frequency of an exclusive process occurring in the CPU unit 100, thus improving the process performance of the CPU unit 100.

If the QoS process is completed, the packet is output from an interface that is set by the relay processing CPU 104 (Step S111). At this time, from among the packet information storing buffers 201, buffer space in which packet information on the output packet is stored is released. Furthermore, if the receiving connection is disconnected after the packet is output, in the receiving connection information table 202, the correlation between the IP address/port corresponding to the receiving connection and the assigned CPU is deleted.

As described above, according to the first embodiment, in addition to a plurality of parallel processing CPUs for each receiving connection, a plurality of QoS processing CPUs is provided; each queue according to the desired quality of the packets is managed by one of the QoS processing CPUs; and the QoS processing CPUs perform a QoS process on packets when the packets are input and output. Accordingly, because a single QoS processing CPU performs an enqueuing process and a dequeuing process on a queue, no conflict occurs between the CPUs with respect to the queues; therefore, an exclusive process becomes unnecessary. As a result, if a plurality of CPUs performs parallel processing on packets, it is possible to reduce the frequency of an exclusive process occurring between the CPUs, thus improving the process performance.

[b] Second Embodiment

During a higher-layer process in a network server, a connection on a client side and a connection on a server side are often terminated. Specifically, in some cases, a connection between the client and a network server is different from that between the network server and the server. Accordingly, there may be a case in which a single parallel processing CPU according to the first embodiment needs to be performed using different connections when a packet is input and output.

Figure 9:
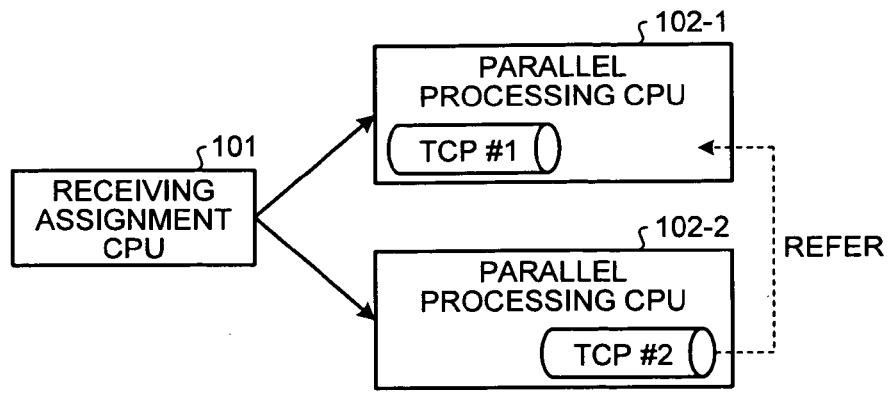
FIG. 9 is a schematic diagram illustrating an example of a conflict with respect to connection information.

Specifically, in the example as illustrated in FIG. 9, if a packet from a receiving connection "TCP #1" is assigned to the parallel processing CPU 102-1, there may be a case in which the receiving connection "TCP #1" is terminated and the packet is sent by a sending connection "TCP #2" that corresponds to a parallel processing CPU 102-2. However, in the first embodiment, because the parallel processing CPU 102-1 that has performed the receiving process on the packet also performs the sending process on the packet, by referring to information on the sending connection "TCP #2" corresponding to the parallel processing CPU 102-2, the parallel processing CPU 102-1 performs a sending process on the packet using the sending connection "TCP #2". Accordingly, when the packet is output, there is a possibility that both the parallel processing CPUs 102-1 and 102-2 may simultaneously access the information on the sending connection "TCP #2", causing an exclusive process to be needed.

Accordingly, a feature of a second embodiment according to the present invention is in that packets to be sent are newly assigned to parallel processing CPUs, and parallel processing CPUs suitable for the respective receiving connection and sending connection perform processes on the packets.

The outline configuration of the packet processing apparatus according to the second embodiment is the same as that in the first embodiment (FIG. 3), and therefore, a description thereof is omitted here. However, in the embodiment, the internal configuration of the CPU unit 100 and the memory 200 is different from that in the first embodiment.

Figure 10:
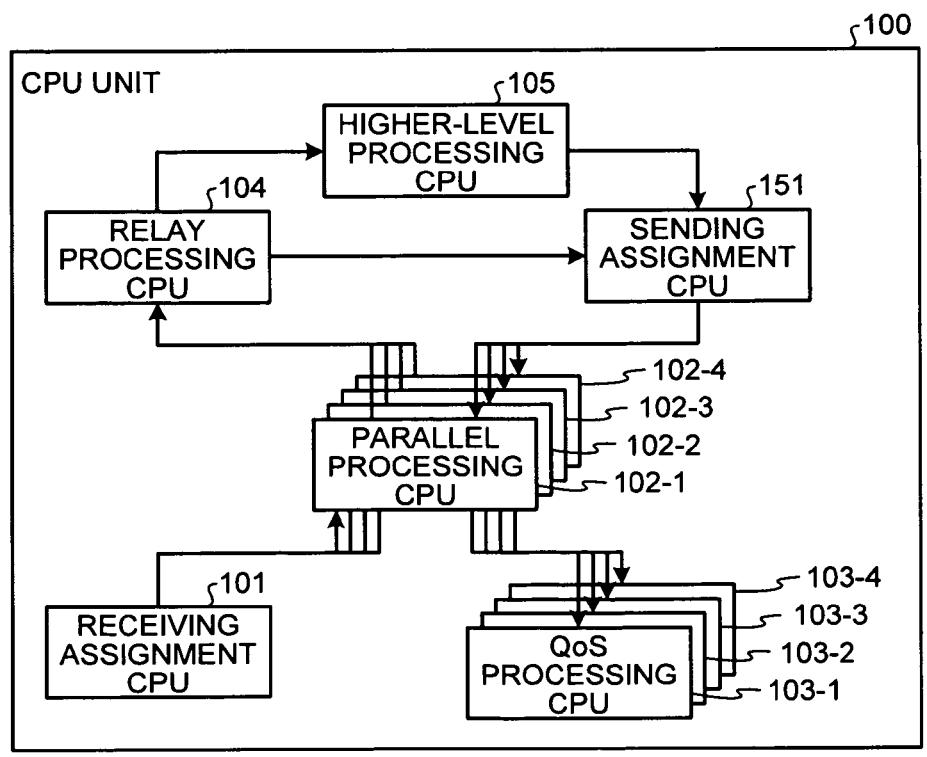
FIG. 10 is a block diagram illustrating the internal configuration of a CPU according to a second embodiment.
Figure 11:
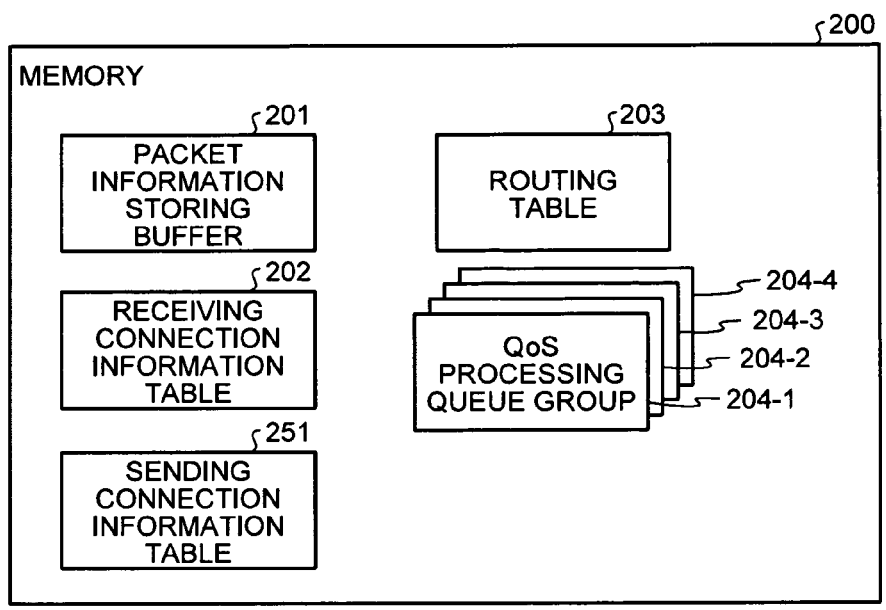
FIG. 11 is a block diagram illustrating the internal configuration of a memory according to the second embodiment.

FIGS. 10 and 11 are block diagrams illustrating the internal configuration of the CPU unit 100 and the memory 200 according to the second embodiment, respectively. In FIGS. 10 and 11, parts that are the same as those in FIGS. 4 and 5 are assigned the same reference numerals, and a description thereof is omitted here. The configuration of the CPU unit 100 illustrated in FIG. 10 is the same as that illustrated in FIG. 4, except that a sending assignment CPU 151 is added thereto. Furthermore, the configuration of the memory 200 illustrated in FIG. 11 is the same as that illustrated in FIG. 5, except that a sending connection information table 251 is added thereto.

In FIG. 10, by referring to the sending connection information table 251 stored in the memory 200, the sending assignment CPU 151 assigns packets to the parallel processing CPUs 102-1 to 102-4 in such a manner that packets that are sent by the same connection are subjected to a sending process by a corresponding parallel processing CPU. Specifically, for example, if packets that are sent from a TCP connection are subjected to a sending process by the parallel processing CPU 102-2, the sending assignment CPU 151 assigns the packets in such a manner that all of the packets that are sent from that TCP connection are subjected to a sending process by the parallel processing CPU 102-2.

At this time, the sending assignment CPU 151 determines, regardless of the parallel processing CPU that has performed the receiving process on the packet, the parallel processing CPU that will perform the sending process. Accordingly, in the example as illustrated in FIG. 9, even though a packet is subjected to a receiving process by the parallel processing CPU 102-1 that corresponds to the receiving connection "TCP #1", when the packet is sent using the sending connection "TCP #2", the sending assignment CPU 151 assigns the processing of the packet to the parallel processing CPU 102-2 that corresponds to the sending connection "TCP #2". However, if a receiving connection of the packet is not terminated in the packet processing apparatus, the receiving connection and the sending connection are the same. Accordingly, the sending assignment CPU 151 assigns the processing of the packet to a parallel processing CPU that has performed the receiving process on the packet.

In this way, in the embodiment, when the packet processing apparatus relays packets, if a receiving connection differs from a sending connection for the same packet, the packets are assigned to parallel processing CPUs corresponding to the connections. Accordingly, in the example as illustrated in FIG. 9, even when the packet processing apparatus terminates a connection, an exclusive process between parallel processing CPUs 102-1 to 102-4 becomes unnecessary.

In FIG. 11, the sending connection information table 251 stores therein the correlation between sending connections for packets that are output from the packet processing apparatus and parallel processing CPUs 102-1 to 102-4 that are assigned objects. Specifically, in a similar manner as in the receiving connection information table 202 illustrated in FIG. 6, the sending connection information table 251 stores therein, in an associated manner, IP addresses/ports corresponding to sending connections and the parallel processing CPUs 102-1 to 102-4 corresponding to assigned objects.

In the sending connection information table 251, the correlation between the IP addresses/ports and the assigned CPUs is determined by the sending assignment CPU 151 every time a new sending connection is established and then registered. If packets are output to an existing sending connection, by referring to the sending connection information table 251, the sending assignment CPU 151 assigns the packets to the corresponding parallel processing CPUs 102-1 to 102-4, serving as the assigned objects of the packets, to which packets previously output to the same sending connection are assigned. Accordingly, all of the packets that are output to the same sending connection are subjected to the sending process by the corresponding parallel processing CPUs 102-1 to 102-4. Therefore, because only one of the parallel processing CPUs 102-1 to 102-4 accesses a piece of corresponding information related to the sending connections, an exclusive process becomes unnecessary.

Figure 12:
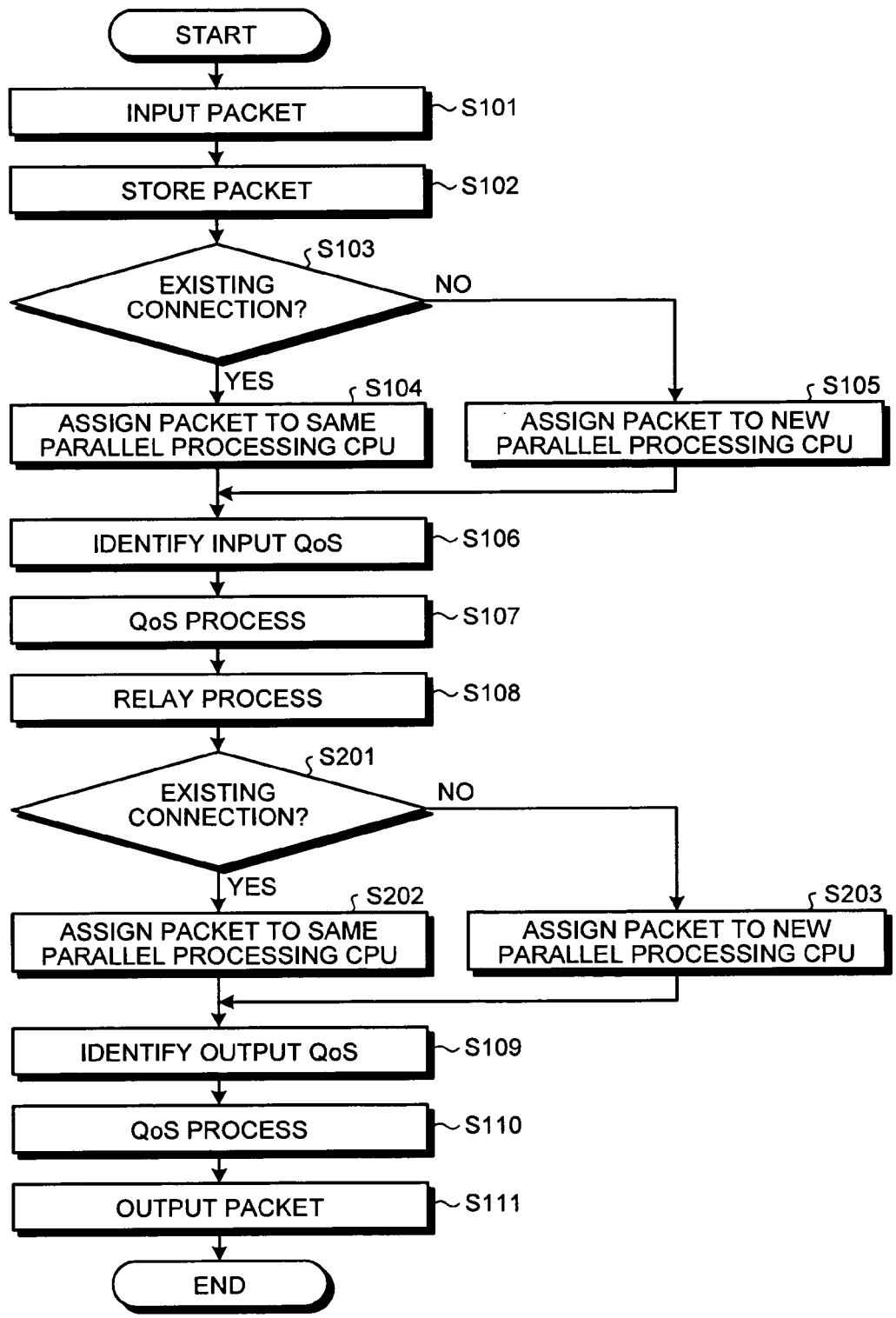
FIG. 12 is a flowchart illustrating an operation performed when packets in the second embodiment are relayed.

In the following, there will be a description, with reference to the flowchart illustrated in FIG. 12, of an operation for relaying packets performed by the packet processing apparatus configured in the above described manner. In FIG. 12, parts that are the same as those in FIG. 8 are assigned the same reference numerals, and a description thereof in detail is omitted here. Accordingly, in the following, a detailed description is mainly given of an operation of the sending assignment CPU 151 in the CPU unit 100.

First, in a similar manner as in the first embodiment, a packet received from the receiving connection is input to the packet processing apparatus (Step S101), and packet information is stored in the packet information storing buffer 201 (Step S102). Then, by referring to the receiving connection information table 202, the receiving assignment CPU 101 determines whether the receiving connection is an existing connection (Step S103). In accordance with the result of this determination, the receiving assignment CPU 101 assigns the processing of the packets to the parallel processing CPU that is the assigned object (Steps S104 and S105). In this case, a description is given by assuming that a process is assigned to the parallel processing CPU 102-1.

If the process is assigned to the parallel processing CPU 102-1, the parallel processing CPU 102-1 performs a predetermined receiving process on the packet. Furthermore, the parallel processing CPU 102-1 identifies the input QoS according to the desired quality of the packet (Step S106) and notifies the QoS processing CPU, corresponding to the identified input QoS, of the input QoS. In this case, a queue corresponding to the input QoS of the packet is assumed to be included in, for example, the QoS processing queue group 204-1 is notified of the input QoS, the QoS processing CPU 103-1 that manages the QoS processing queue group 204-1. If the QoS processing CPU 103-1 is notified of the input QoS, the QoS processing CPU 103-1 performs a QoS process on a queue that corresponds to the input QoS in the QoS processing queue group 204-1 (Step S107).

If the QoS process is completed, the relay processing CPU 104 performs a relay process for setting the destination of the packet (Step S108). Furthermore, if a higher-layer process that is difficult to be performed by the parallel processing CPUs 102-1 to 102-4 is performed, the higher-level processing CPU 105 performs the higher-layer process.

Upon the completion of the relay process and the higher-layer process, by checking an IP address and a port using packet information and referring to the sending connection information table 251, the sending assignment CPU 151 determines whether a sending connection that transmits the packet is an existing connection (Step S201). Specifically, if the IP address and the port of the packet have been registered in the sending connection information table 251, the sending assignment CPU 151 determines that a sending connection of the packet is an existing connection. If the IP address and the port of the packet have not been registered in the sending connection information table 251, the sending assignment CPU 151 determines that the sending connection of the packet is a new connection.

If the determination result indicates that the sending connection is an existing connection (Yes at Step S201), the sending assignment CPU 151 reads, from the sending connection information table 251, the destination CPU corresponding to the IP address and the port of the packet and assigns the processing of the packet to the parallel processing CPU that is the assigned object. In other words, the processing of the packet is assigned to the parallel processing CPU that has performed a process on a packet that is previously input thereto from the same sending connection (Step S202). Accordingly, even if the receiving connection of the packet is terminated in the packet processing apparatus, and even if the receiving connection is different from the sending connection, the processing of the packet is assigned to the parallel processing CPU corresponding to the sending connection of the packet.

In contrast, if the sending connection is a new connection (No at Step S201), the sending assignment CPU 151 selects a free parallel processing CPU; determines the free parallel processing CPU as the assigned object of the packet; and registers, in the sending connection information table 251, the correlation between the IP address and the port of the packet and the parallel processing CPUs corresponding to the assigned objects. In other words, the packet is assigned to a new parallel processing CPU in which a process is not currently being performed (Step S203). Accordingly, even in a case where a receiving connection of a packet is terminated in the packet processing apparatus and thus sending connection is newly established, the processing of the packet is assigned to a parallel processing CPU corresponding to the new sending connection.

In this way, processes performed on the packets that are output from the packet processing apparatus are assigned to the same parallel processing CPU for each sending connection. In this case, a description is given on the assumption that the process is assigned to the parallel processing CPU 102-2.

If the process is assigned to the parallel processing CPU 102-2, the parallel processing CPU 102-2 performs a predetermined sending process on the packet. Furthermore, the parallel processing CPU 102-2 identifies the output QoS corresponding to the desired quality of the packet (Step S109) and notifies the QoS processing CPU, corresponding to the identified output QoS, of the output QoS. Then, the QoS processing CPU performs a QoS process on the queue corresponding to the output QoS (Step S110) and outputs the packet from an interface set by the relay processing CPU 104 (Step S111).

As described above, according to the second embodiment, when a packet is input, a process is not only assigned to a parallel processing CPU according to the receiving connection, but, when a packet is output, a process is also assigned to a parallel processing CPU according to the sending connection. Accordingly, even if, for example, a receiving connection is terminated in the packet processing apparatus and the receiving connection of the packet is different from the sending connection thereof, it is possible to assign processes to parallel processing CPUs according to each connection. Thus, no access conflict occurs in a plurality of parallel processing CPUs with respect to information related to a single connection; therefore, an exclusive process becomes unnecessary. As a result, if a plurality of CPUs performs parallel processing on packets, it is possible to further reliably reduce the frequency of an exclusive process occurring between the plurality of CPUs, thus improving the process performance.

Furthermore, in the embodiments described above, it has been mentioned that the packet processing apparatus includes dedicated CPUs, such as the receiving assignment CPU 101, the QoS processing CPUs 103-1 to 103-4, and the sending assignment CPU 151; however the present invention is not limited thereto. For example, if a plurality of general-purpose CPUs is provided in a commonly-used computer, it is possible to install, in the computer, a program causing each CPU to execute a process similar to the embodiments described above and to operate the computer in a similar manner as that described in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet processing apparatus comprising:
an identifying unit that identifies a type of communication used for transmitting a received packet;
a plurality of processing units that are provided in a manner corresponding respectively to types of communication and each identify a desired quality of the packet for which the identifying unit identifies the type of communication;
a plurality of queues that are provided in a manner corresponding respectively to desired qualities of packets; and
a plurality of queue processing units that are provided separately from the plurality of processing units in a manner corresponding respectively to the plurality of queues, and each perform a queue process using one of the plurality of queues corresponding to the desired quality of the packet identified by the corresponding processing unit,
a receiving assignment unit that assigns, when the packet is received by the packet processing apparatus, the received packet to the processing unit corresponding to a receiving connection that transmits the packet to the packet processing apparatus; and
a sending assignment unit that assigns, when the packet is to be sent from the packet processing apparatus, the packet to the processing unit corresponding to a sending connection that transmits the packet from the packet processing apparatus, wherein
the processing unit notifies the desired quality of the packet identified for the processing unit to the queue processing unit corresponding to the desired quality of the packet identified for the processing unit, and
each of the queues corresponds to one of the queue processing units.

2. The packet processing apparatus according to claim 1, further comprising a relay processing unit that is provided separately from the plurality of processing units and sets a destination of the packet that has been processed by the corresponding processing unit.

3. A packet processing method, comprising:
first identifying a type of communication used for transmitting a received packet;
second identifying, using a plurality of processing units that are provided in a manner corresponding respectively to types of communication, a desired quality of the packet for which the type of communication is identified at the first identifying; and performing, using a queue corresponding to the desired quality of the packet identified at the second identifying among a plurality of queues each corresponding to desired qualities of packets and using a plurality of queue processing units that are provided separately from the plurality of processing units in a manner corresponding respectively to the plurality of queues, a queue process on the packet which desired quality is identified at the second identifying, assigning, when the packet is received, the received packet to the processing unit corresponding to a receiving connection for receiving the packet; and assigning, when the packet is to be sent, the packet to the processing unit corresponding to a sending connection that transmits the packet, wherein the second identifying includes notifying the desired quality of the packet identified for the processing unit to the queue processing unit corresponding to the desired quality of the packet identified for the processing unit, and each of the queues corresponds to one of the queue processing units.

* * * * *